US012658662B2

(12) United States Patent
Takeuchi

(10) Patent No.: US 12,658,662 B2
(45) Date of Patent: Jun. 16, 2026

(54) OPTICAL AMPLIFIER, OPTICAL RELAY, AND OPTICAL COMMUNICATION SYSTEM

(71) Applicant: NEC Corporation, Tokyo (JP)

(72) Inventor: Takeshi Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 553 days.

(21) Appl. No.: 18/268,859

(22) PCT Filed: Mar. 22, 2022

(86) PCT No.: PCT/JP2022/012953
§ 371 (c)(1),
(2) Date: Jun. 21, 2023

(87) PCT Pub. No.: WO2022/202737
PCT Pub. Date: Sep. 29, 2022

(65) Prior Publication Data
US 2024/0297475 A1 Sep. 5, 2024

(30) Foreign Application Priority Data

Mar. 25, 2021 (JP) ................................. 2021-051265

(51) Int. Cl.
*H01S 3/094* (2006.01)
*H01S 3/067* (2006.01)
(Continued)

(52) U.S. Cl.
CPC .... *H01S 3/094049* (2013.01); *H01S 3/06716* (2013.01); *H01S 3/09415* (2013.01);
(Continued)

(58) Field of Classification Search
CPC ........... H01S 3/094049; H01S 3/06716; H01S 3/1608; H01S 3/2308; H01S 3/2383;
(Continued)

(56) References Cited

U.S. PATENT DOCUMENTS

2004/0114933 A1 * 6/2004 Shimomura ........ H04J 14/0204
398/92
2012/0321299 A1 * 12/2012 Oguma ............. H04J 14/02216
398/34
(Continued)

FOREIGN PATENT DOCUMENTS

DE         19627156       1/1998
JP      2007-214170       8/2007
(Continued)

OTHER PUBLICATIONS

P. Genevaux et al., "A Five-Mode Erbium-Doped Fiber Amplifier for Mode-Division Multiplexing Transmission," in Journal of Lightwave Technology, vol. 34, No. 2, pp. 456-462, Jan. 15, 15, 2016, doi: 10.1109/JLT.2015.2481082 (Year: 2016).*
(Continued)

*Primary Examiner* — Matthew Mikels
(74) *Attorney, Agent, or Firm* — Sughrue Mion, PLLC

(57) ABSTRACT

Provided is an optical amplifier, an optical relay and an optical communication system that can amplify signal light of a plurality of systems and that can realize a reduction in costs. This optical amplifier amplifies and outputs signal light of a plurality of systems, the amplifier including: a plurality of impurity-doped optical fiber amplification units; a plurality of excitation light sources; a plurality of excitation light demultiplexing units; a plurality of excitation light multiplexing/demultiplexing units; and a plurality of multiplexing units. The plurality of excitation light sources include at least a first excitation light source and a second excitation light source that are driven commonly by a first driving current, and a third excitation light source that is driven by a second driving current of a different system than the first driving current.

20 Claims, 9 Drawing Sheets

(51) Int. Cl.

| | |
|---|---|
| *H01S 3/0941* | (2006.01) |
| *H01S 3/16* | (2006.01) |
| *H01S 3/23* | (2006.01) |
| *H04B 10/293* | (2013.01) |
| *H04J 14/02* | (2006.01) |

(52) U.S. Cl.
CPC .......... *H01S 3/1608* (2013.01); *H01S 3/2308* (2013.01); *H01S 3/2383* (2013.01); *H04B 10/293* (2013.01); *H04J 14/0307* (2023.08)

(58) Field of Classification Search
CPC ........... H01S 3/06754; H01S 3/094003; H01S 3/067; H01S 3/094061; H01S 3/10; H04B 10/293
See application file for complete search history.

(56) References Cited

U.S. PATENT DOCUMENTS

| | | | |
|---|---|---|---|
| 2015/0048238 | A1 | 2/2015 | Kawai |
| 2019/0052390 | A1 | 2/2019 | Mikami |
| 2022/0102932 | A1 | 3/2022 | Mikami |

FOREIGN PATENT DOCUMENTS

| | | |
|---|---|---|
| JP | 2014-160908 | 9/2014 |
| WO | 2013/121744 | 8/2013 |
| WO | 2017/056438 | 4/2017 |
| WO | 2018/097075 | 5/2018 |
| WO | 2020/158532 | 8/2020 |

OTHER PUBLICATIONS

International Search Report for PCT Application No. PCT/JP2022/012953, mailed on Jun. 14, 2022.

English translation of Written opinion for PCT Application No. PCT/JP2022/012953, mailed on Jun. 14, 2022.

* cited by examiner

Fig. 3

$$K11 \cdot A + K12 \cdot B + K13 \cdot C = P1 \quad \cdots \cdots (1)$$

$$K21 \cdot A + K22 \cdot B + K23 \cdot C = P2 \quad \cdots \cdots (2)$$

$$K31 \cdot A + K32 \cdot B + K33 \cdot C = P3 \quad \cdots \cdots (3)$$

$$K41 \cdot A + K42 \cdot B + K43 \cdot C = P4 \quad \cdots \cdots (4)$$

$$K51 \cdot A + K52 \cdot B + K53 \cdot C = P5 \quad \cdots \cdots (5)$$

Fig. 4

$$K11 \cdot A + K12 \cdot B + K13 \cdot C = P1 = P \quad \cdots \cdots (1)$$

$$K21 \cdot A + K22 \cdot B + K23 \cdot C = P2 = P \quad \cdots \cdots (2)$$

$$K31 \cdot A + K32 \cdot B + K33 \cdot C = P3 = P \quad \cdots \cdots (3)$$

$$K41 \cdot A + K42 \cdot B + K43 \cdot C = P4 = P \quad \cdots \cdots (4)$$

$$K51 \cdot A + K52 \cdot B + K53 \cdot C = P5 = P \quad \cdots \cdots (5)$$

Fig. 5

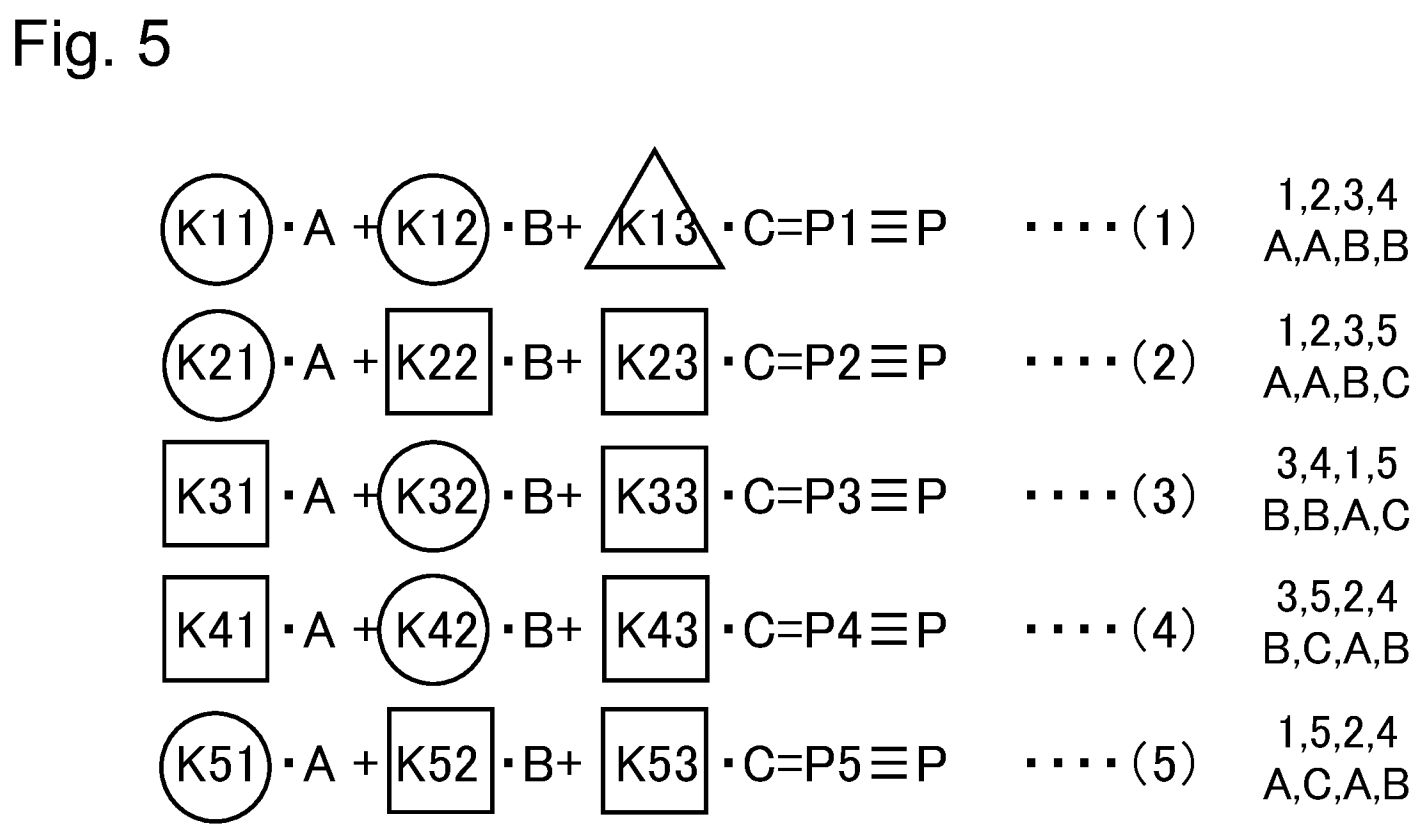

$$K11 \cdot A + K12 \cdot B + K13 \cdot C = P1 = P \quad \cdots (1) \quad \begin{array}{l} 1,2,3,4 \\ A,A,B,B \end{array}$$

$$K21 \cdot A + K22 \cdot B + K23 \cdot C = P2 = P \quad \cdots (2) \quad \begin{array}{l} 1,2,3,5 \\ A,A,B,C \end{array}$$

$$K31 \cdot A + K32 \cdot B + K33 \cdot C = P3 = P \quad \cdots (3) \quad \begin{array}{l} 3,4,1,5 \\ B,B,A,C \end{array}$$

$$K41 \cdot A + K42 \cdot B + K43 \cdot C = P4 = P \quad \cdots (4) \quad \begin{array}{l} 3,5,2,4 \\ B,C,A,B \end{array}$$

$$K51 \cdot A + K52 \cdot B + K53 \cdot C = P5 = P \quad \cdots (5) \quad \begin{array}{l} 1,5,2,4 \\ A,C,A,B \end{array}$$

Fig. 6

$$K11 \cdot A + K12 \cdot B + K13 \cdot C = P \quad \cdots (1)$$

$$KX1 \cdot A + KX2 \cdot B + KX3 \cdot C = P \quad \cdots (2)$$

$$KY1 \cdot A + KY2 \cdot B + KY3 \cdot C = P \quad \cdots (3)$$

$$KY1 \cdot A + KY2 \cdot B + KY3 \cdot C = P \quad \cdots (4)$$

$$KX1 \cdot A + KX2 \cdot B + KX3 \cdot C = P \quad \cdots (5)$$

Fig. 7

$$K11 \cdot A + K12 \cdot B + K13 \cdot C = P \quad \cdots (1)$$

$$KX1 \cdot A + KX2 \cdot B + KX3 \cdot C = P \quad \cdots (2)$$

$$KY1 \cdot A + KY2 \cdot B + KY3 \cdot C = P \quad \cdots (3)$$

OPTICAL AMPLIFIER, OPTICAL RELAY, AND OPTICAL COMMUNICATION SYSTEM

This application is a National Stage Entry of PCT/JP2022/012953 filed on Mar. 22, 2022, which claims priority from Japanese Patent Application 2021-051265 filed on Mar. 25, 2021, the contents of all of which are incorporated herein by reference, in their entirety.

The present disclosure relates to an optical amplifier, an optical relay, and an optical communication system, and in particular relates to an excitation light source to be used in amplification of signal light performed by the optical amplifier.

BACKGROUND ART

In an optical communication system, a fiber-type amplifier is used for amplifying an attenuated optical signal. Examples of the fiber-type amplifier that amplifies an attenuated optical signal include a fiber-type amplifier that amplifies signal intensity of an optical signal by inputting excitation light being output from an excitation light source to a rare-earth element-doped fiber into which the optical signal is input. Such a fiber-type amplifier has high efficiency and high gain and is used as an amplifier for relaying an optical signal in an optical fiber communication system.

Basically, one fiber-type amplifier as described above is installed in one optical communication path, and, when optical signals are wavelength division multiplexing (WDM) signals and required to be separately amplified with respect to each wavelength, a plurality of fiber-type amplifiers are installed in parallel in one optical communication path. In a case where a plurality of optical communication paths through which an optical signal propagates exist in parallel, one fiber-type amplifier is installed in each of the optical communication path.

Next, an optical amplifier for such parallel optical communication paths according to the background art is described. FIG. 9 is a configuration diagram for describing an optical amplifier of the background art. Herein, description is made by assuming a case where optical communication paths of four systems through which signal light propagates exist.

The optical amplifier in FIG. 9 includes four fiber-type amplifiers (an EDFA 101, an EDFA 102, an EDFA 103, and an EDFA 104) for signal light of four systems (as used herein, EDFA is an abbreviation of erbium-doped optical fiber amplifier). The optical amplifier in FIG. 9 further includes four laser diodes (an LD 105, an LD 106, an LD 107, and an LD 108) serving as excitation light sources. Driving currents of the LDs 105 to 108 are adjusted by a control system (not illustrated) for each LD, and thereby intensity of excitation light that the LDs 105 to 108 output is adjusted. Principally, the driving currents of the LDs 105 to 108 are adjusted in such a way that signal light output power of the optical amplifier in FIG. 9 becomes constant.

The optical amplifier in FIG. 9 further includes wavelength division multiplexing (WDM) couplers 109, 110, 111, and 112 each of which multiplexes signal light propagating through each of the optical communication paths and excitation light. The optical amplifier in FIG. 9 further includes an excitation light multiplexing/demultiplexing unit indicated by a dotted line. The excitation light multiplexing/demultiplexing unit in FIG. 9 includes a 2×2 coupler 113 that multiplexes excitation light from the LD 105 and the LD 106 and demultiplexes the multiplexed excitation light into two beams of excitation light and a 2×2 coupler 114 that multiplexes excitation light from the LD 107 and the LD 108 and demultiplexes the multiplexed excitation light into two beams of excitation light. The excitation light multiplexing/demultiplexing unit in FIG. 9 further includes a 2×2 coupler 115 that multiplexes excitation light from the 2×2 coupler 113 and excitation light from the 2×2 coupler 114, demultiplexes the multiplexed excitation light into two beams of excitation light, and outputs the excitation light to the WDM coupler 109 and the WDM coupler 110. The excitation light multiplexing/demultiplexing unit in FIG. 9 further includes a 2×2 coupler 116 that multiplexes excitation light from the 2×2 coupler 113 and excitation light from the 2×2 coupler 114, demultiplexes the multiplexed excitation light into two beams of excitation light, and outputs the excitation light to the WDM coupler 111 and the WDM coupler 112.

The optical amplifier in FIG. 9 has a 4-LD redundant configuration in which each of the four fiber-type amplifiers (the EDFA 101, the EDFA 102, the EDFA 103, and the EDFA 104) is excited by excitation light from the four LDs 105 to 108. Specifically, the optical amplifier has a configuration in which, even when, for example, one LD of the four LDs 105 to 108 malfunctions and emits no output light, excitation light from the other three LDs is incident on the EDFAs and optical communication is maintained.

The optical amplifier in FIG. 9 is, by including the excitation light multiplexing/demultiplexing unit, capable of making influence of variation in intensity of excitation light generated by the LDs 105, 106, 107, and 108 smaller than a configuration in which excitation light generated by the LDs 105, 106, 107, and 108 are directly output to the WDM couplers 109, 110, 111, and 112, respectively.

PTL 1 describes an optical signal relay for a first optical communication path and a second optical communication path that are parallel with each other, and proposes a configuration in which an optical signal propagating through the first optical communication path is amplified by a first fiber-type optical amplifier inserted in the first optical communication path and an optical signal propagating through the second optical communication path is amplified by a second fiber-type optical amplifier inserted in the second optical communication path. Further, PTL 1 proposes using a first semiconductor laser for excitation and a second semiconductor laser for excitation, which are aligned in parallel, as excitation light sources for the first fiber-type optical amplifier and the second fiber-type optical amplifier.

PTL 2 describes an optical fiber-type amplifier and proposes that the optical fiber-type amplifier includes a multiplexing laser source including a plurality of laser diodes, amplifies an optical signal by inserting one optical fiber-type amplifier in one optical signal path, and multiplexes excitation light from the plurality of laser diodes and subsequently causes the multiplexed excitation light to be incident on an input side of a rare-earth element-doped fiber. Further, PTL 2 proposes that a driving current control circuit for the plurality of laser diodes changes driving current of the laser diode in such a way that, even when one laser diode among the plurality of laser diodes malfunctions, signal light output power is made constant by the optical fiber-type amplifier.

CITATION LIST

Patent Literature

PTL 1: Japanese Unexamined Patent Application Publication No. 2014-160908

PTL 2: Japanese Unexamined Patent Application Publication No. 2007-214170

SUMMARY OF INVENTION

Technical Problem

As described above, in the optical amplifier of the background art, it is common practice that one optical fiber-type amplifier is basically installed in one optical communication path and as many excitation light sources as the optical fiber-type amplifiers are used. When optical signals are wavelength division multiplexing (WDM) signals and required to be separately amplified with respect to each wavelength, a plurality of fiber-type amplifiers are installed in parallel in one optical communication path.

Cost reduction with respect to such an optical amplifier is considered. For example, for eight optical fiber-type amplifiers amplifying signal light of eight systems, eight excitation light sources are required. When cost reduction of the optical fiber-type amplifier is considered, a component incurring the highest cost is an excitation light source. Thus, it is expected to configure an optical amplifier by using smaller number of excitation light sources than the number of optical fiber-type amplifiers.

However, in PTLs 1 and 2 described above, there is no description related to configuring an optical amplifier by using smaller number of excitation light sources than the number of optical fiber-type amplifiers.

An object of the present disclosure is to provide an optical amplifier, an optical relay, and an optical communication system that are capable of amplifying signal light of a plurality of systems and achieving cost reduction.

Solution to Problem

In order to achieve the above-described object, an optical amplifier according to the present disclosure is an optical amplifier that amplifies and outputs signal light of a plurality of systems and includes:

a plurality of impurity-doped optical fiber amplification units; a plurality of excitation light sources; a plurality of excitation light demultiplexing units that demultiplex excitation light from the plurality of excitation light sources; a plurality of excitation light multiplexing/demultiplexing units that multiplex and demultiplex excitation light from the plurality of excitation light demultiplexing units; and a plurality of multiplexing units each of which multiplexes one of the plurality of beams of signal light and excitation light from the plurality of excitation light multiplexing/demultiplexing units and subsequently inputs the multiplexed light to one of the plurality of impurity-doped optical fiber amplification units, wherein the number of the plurality of excitation light sources is smaller than the number of the plurality of impurity-doped optical fiber amplification units, and the plurality of excitation light sources include at least a first excitation light source and a second excitation light source that are driven in common by a first driving current and a third excitation light source that is driven by a second driving current of a different system from the first driving current, the plurality of excitation light demultiplexing units include at least a first excitation light demultiplexing unit, a second excitation light demultiplexing unit, and a third excitation light demultiplexing unit, the plurality of excitation light multiplexing/demultiplexing units include at least a first excitation light multiplexing/demultiplexing unit, a second excitation light multiplexing/demultiplexing unit, and a third excitation light multiplexing/demultiplexing unit, excitation light from the plurality of excitation light sources goes through the plurality of excitation light demultiplexing units and the plurality of excitation light multiplexing/demultiplexing units and is input to the plurality of multiplexing units, and the plurality of excitation light sources, the plurality of excitation light demultiplexing units, and the plurality of excitation light multiplexing/demultiplexing units are selected in consideration of contribution of excitation light from the first excitation light source and excitation light from the second excitation light source, and contribution of excitation light from the third excitation light source, to an optical output of each impurity-doped optical fiber amplification unit among the plurality of impurity-doped optical fiber amplification units.

An optical relay according to the present disclosure includes the optical amplifier described above, being inserted in an optical fiber that propagates the signal light of a plurality of systems.

An optical communication system according to the present disclosure includes: an optical fiber that connects a plurality of terminal stations and propagates signal light of a plurality of systems; and the optical relay described above.

Advantageous Effects of Invention

According to the present disclosure, it is possible to provide an optical amplifier, an optical relay, and an optical communication system that are capable of amplifying signal light of a plurality of systems and achieving cost reduction, by using a plurality of excitation light sources the number of which is smaller than the number of a plurality of optical fiber amplification units that amplify signal light of a plurality of systems.

BRIEF DESCRIPTION OF DRAWINGS

FIG. 3 is relational equations relating to current amounts of excitation light sources and optical outputs of EDFAs in the optical amplifier in FIG. 2.

FIG. 4 is relational equations for calculating the current amounts of the excitation light sources from the relational equations in FIG. 3.

FIG. 5 is an explanatory diagram in which coefficients K are marked by symbols in the relational equations in FIG. 4.

FIG. 6 is relational equations converted from the relational equations in FIG. 5 by focusing on the symbols to calculate the current amounts of the excitation light sources.

FIG. 7 is relational equations acquired from the relational equations in FIG. 6.

EXAMPLE EMBODIMENT

Outline of Example Embodiment

Figure 8:
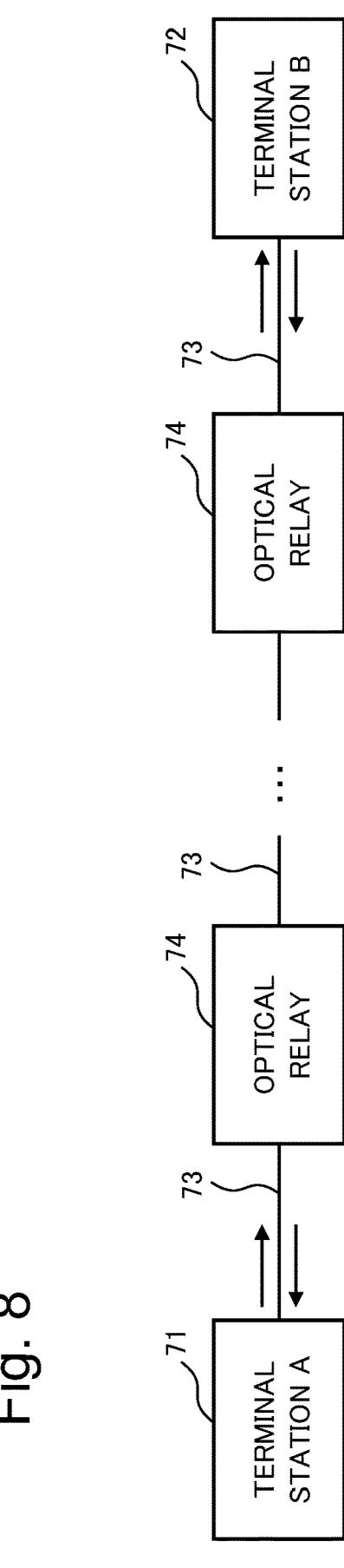
FIG. 8 is a configuration diagram for a description of an optical relay and an optical communication system of the one example embodiment according to the present invention.

An optical communication system according to an example embodiment according to the present invention includes an optical fiber 73 that serves as one example of a transmission line as illustrated in FIG. 8. The transmission line connects an optical transmission device 71 in a terminal station A and an optical transmission device 72 in a terminal station B as illustrated in FIG. 8 and transmits signal light transmitted and received between the optical transmission device 71 and the optical transmission device 72. The optical communication system further includes optical relays 74 that are inserted in the optical fiber 73 serving as one example of the transmission line between the optical transmission device 71 and the optical transmission device 72 and amplify the signal light. In FIG. 8, a state in which a plurality of optical relays 74 are inserted in the optical fiber 73 is illustrated. Further, each of the optical relays 74 includes an optical amplifier that amplifies signal light beams propagating through the transmission line.

The optical amplifier according to the example embodiment according to the present disclosure is an optical fiber-type amplifier that amplifies and outputs signal light of a plurality of systems, and includes a plurality of impurity-doped optical fiber amplification units and a plurality of excitation light sources the number of which is smaller than the number of the plurality of impurity-doped optical fiber amplification units. Further, the plurality of excitation light sources include at least a first excitation light source and a second excitation light source that are driven in common by a first driving current and a third excitation light source that is driven by a second driving current of a different system from that of the first driving current. Further, the optical amplifier according to the example embodiment according to the present invention includes a plurality of excitation light demultiplexing units that demultiplex excitation light from the plurality of excitation light sources, a plurality of excitation light multiplexing/demultiplexing units that multiplex and demultiplex excitation light from the plurality of excitation light demultiplexing units, and a plurality of multiplexing units each of which multiplexes one of the plurality of beams of signal light and excitation light from the plurality of excitation light multiplexing/demultiplexing units and subsequently inputs the multiplexed light beam to one of the plurality of impurity-doped optical fiber amplification units. In the optical amplifier according to the example embodiment of the present invention, the plurality of excitation light sources, the plurality of excitation light demultiplexing units, and the plurality of excitation light multiplexing/demultiplexing units are selected in consideration of contribution of excitation light from the first excitation light source and excitation light from the second excitation light source and contribution of excitation light from the third excitation light source to an optical output of each impurity-doped optical fiber amplification unit among the plurality of impurity-doped optical fiber amplification units. Then, efficiencies of the excitation light sources, transmission losses of the excitation light demultiplexing units and the excitation light multiplexing/demultiplexing units, and efficiencies of the impurity-doped optical fiber amplification units are adjusted according to which excitation light source among the plurality of excitation light sources is driven by an identical driving current. Further, driving currents of the plurality of excitation light sources are adjusted in such a way that all the optical output of the plurality of impurity-doped optical fiber amplification units become equal to one another.

Example Embodiment of Superordinate Concept

Figure 1:
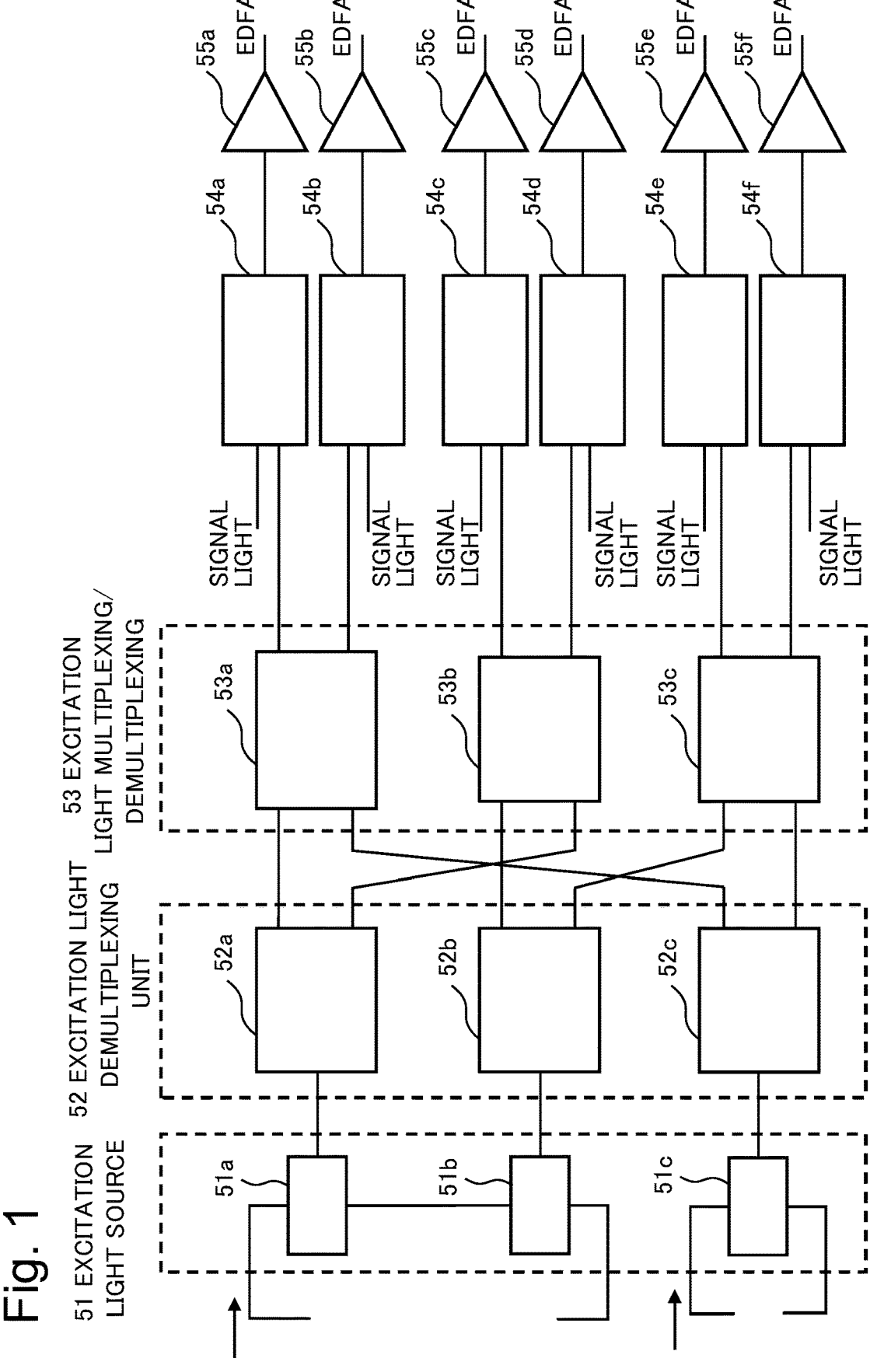
FIG. 1 is a configuration diagram of an optical amplifier of an example embodiment of a superordinate concept of the present invention.

An optical amplifier, an optical relay, and an optical communication system according to an example embodiment of a superordinate concept of the present invention will be described with reference to the drawings. FIG. 1 is a configuration diagram of the optical amplifier according to the example embodiment of the superordinate concept of the present invention. The optical amplifier illustrated in FIG. 1 is used for the optical relays 74 in FIG. 8 described above, is inserted in the optical fiber 73 serving as one example of a transmission line between the optical transmission device 71 and the optical transmission device 72, and amplifies signal light propagating through the optical fiber 73. The optical communication system of the present example embodiment, as with the configuration in FIG. 8, includes the optical fiber 73 that connects the optical transmission device 71 in a terminal station A and the optical transmission device 72 in a terminal station B and serves as one example of the transmission line that transmits signal light transmitted and received between the optical transmission device 71 and the optical transmission device 72 and optical relays 74 that are inserted in the optical fiber 73 and amplify the signal light.

The optical amplifier in FIG. 1 is an optical fiber-type amplifier that amplifies and outputs signal light of a plurality of systems. In FIG. 1, a configuration that amplifies signal light of six systems is illustrated as one example of a configuration that amplifies signal light of a plurality of systems. The optical amplifier in FIG. 1 includes six erbium-doped fiber amplification units 55a to 55f (EDFAs 55a to 55f) as one example of a plurality of impurity-doped optical fiber amplification units and a plurality of excitation light sources 51. The optical amplifier in FIG. 1 further includes a plurality of excitation light demultiplexing units 52 that demultiplex excitation light from the plurality of excitation light sources 51, a plurality of excitation light multiplexing/demultiplexing units 53 that multiplex and demultiplex excitation light from the plurality of excitation light demultiplexing units 52, and a plurality of multiplexing units 54a to 54f each of which multiplexes one of the plurality of beams of signal light and excitation light from the plurality of excitation light multiplexing/demultiplexing units 53 and subsequently inputs the multiplexed light to one of the six EDFAs 55a to 55f.

In the optical amplifier in FIG. 1, the number of the plurality of excitation light sources 51 is smaller than the number of the EDFAs 55a to 55f and the plurality of excitation light sources 51 include a first excitation light source 51a and a second excitation light source 51b that are driven in common by a first driving current and a third excitation light source 51c that is driven by a second driving current of a different system from that of the first driving current. In the optical amplifier in FIG. 1, the number of the plurality of excitation light sources 51 is three. In the optical amplifier in FIG. 1, the plurality of excitation light demultiplexing units 52 include a first excitation light demultiplexing unit 52a, a second excitation light demultiplexing unit 52b, and a third excitation light demultiplexing unit 52c. In the optical amplifier in FIG. 1, the plurality of excitation light multiplexing/demultiplexing units 53 include a first excitation light multiplexing/demultiplexing unit 53a, a second excitation light multiplexing/demultiplexing unit 53b, and a third excitation light multiplexing/demultiplexing unit 53c. In the optical amplifier in FIG. 1, excitation light from the plurality of excitation light sources 51 (the first excitation light source 51a, the second excitation light source 51b, and the third excitation light source 51c) go through the plurality of excitation light demultiplexing units 52 and the plurality of excitation light multiplexing/demultiplexing units 53 and are input to the plurality of multiplexing units 54a to 54f. In the optical amplifier in FIG. 1, the plurality of excitation light sources 51, the plurality of excitation light demultiplexing units 52, and the excitation light multiplexing/demultiplexing units 53 are selected in consideration of contribution of excitation light from the first excitation light source 51a and excitation light from the second excitation light source 51b and contribution of excitation light from the third excitation light source 51c to an optical output of each impurity-doped optical fiber amplification unit among the plurality of impurity-doped optical fiber amplification units.

The optical outputs of the EDFAs 55a to 55f are controlled by power of excitation light from the excitation light sources 51 that are incident on the EDFAs. Output power of the first excitation light source 51a, the second excitation light source 51b, and the third excitation light source 51c in the excitation light sources 51 is controlled by driving currents supplied to the first excitation light source 51a, the second excitation light source 51b, and the third excitation light source 51c. In other words, the optical outputs of the EDFAs are controlled by a current amount of the first driving current supplied to the first excitation light source 51a and the second excitation light source 51b and a current amount of the second driving current being supplied to the third excitation light source 51c and is a driving current of a different system from that of the first driving current.

In an optical communication system including a plurality of optical fiber channels, it is preferable to adjust outputs from impurity-doped optical fiber amplification units of the channels in such a way that the outputs become equal to one another as much as possible. In the optical amplifier in FIG. 1, a combination of components, such as the plurality of excitation light sources 51, the plurality of excitation light demultiplexing units 52, and the excitation light multiplexing/demultiplexing units 53, is optimized in consideration of influence of excitation light from the first excitation light source 51a and excitation light from the second excitation light source 51b and influence of excitation light from the third excitation light source 51c on the optical outputs of the EDFAs 55a to 55f. For example, when both excitation light from the first excitation light source 51a and excitation light from the second excitation light source 51b contribute to the optical output of one EDFA among the EDFAs 55a to 55f, a combination of components, such as the plurality of excitation light sources 51, the plurality of excitation light demultiplexing units 52, and the excitation light multiplexing/demultiplexing units 53, is optimized while significantly evaluating the magnitude of the contribution. In addition, for example, when excitation light from the third excitation light source 51c does not contribute to the optical output of one EDFA among the EDFAs 55a to 55f, a combination of components, such as the plurality of excitation light sources 51, the plurality of excitation light demultiplexing units 52, and the excitation light multiplexing/demultiplexing units 53, is optimized while evaluating that there is no contribution from the excitation light.

According to the present example embodiment, it is possible to provide an optical amplifier, an optical relay, and an optical communication system capable of amplifying signal light of a plurality of systems and achieving cost reduction. The reason is that, for six EDFAs 55a to 55f that amplify signal light of a plurality of systems, an optical amplifier can be configured including three excitation light sources 51 (the first excitation light source 51a, the second excitation light source 51b, and the third excitation light source 51c), the number of which is smaller than the number of the EDFAs 55a to 55f. Another reason is that employing a configuration in which the first excitation light source 51a and the second excitation light source 51b among the plurality of excitation light sources 51 are driven in common by the first driving current enables the configuration to be simplified compared with a case where the first excitation light source 51a and the second excitation light source 51b are separately controlled by different control systems. Still another reason is that, at the time of the configuration, the combination of components, such as the plurality of excitation light sources 51, the plurality of excitation light demultiplexing units 52, and the excitation light multiplexing/demultiplexing units 53, is optimized in consideration of influence of excitation light from the first excitation light source 51a and excitation light from the second excitation light source 51b and influence of excitation light from the third excitation light source 51c. A preferable example embodiment of the present invention will be described below in detail with reference to the drawings.

One Example Embodiment

Next, an optical amplifier, an optical relay, and an optical communication system according to one example embodiment according to the present invention will be described with reference to the drawings.

Figure 2:
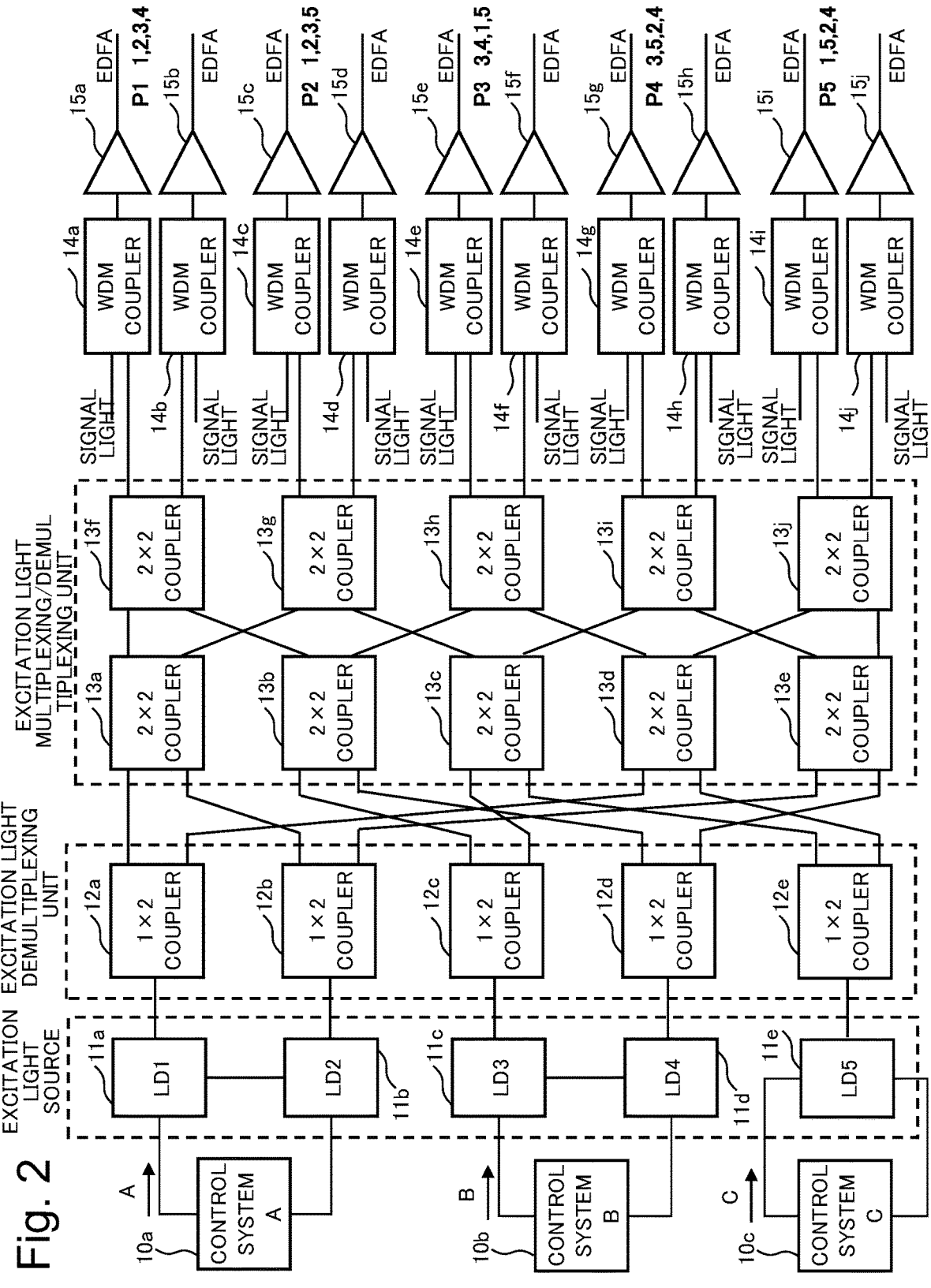
FIG. 2 is a configuration diagram of an optical amplifier of one example embodiment according to the present invention.

The present example embodiment will be described in detail with reference to the drawings. FIG. 2 is a diagram describing an optical amplifier of the one example embodiment according to the present invention. The optical amplifier illustrated in FIG. 2 is used for the optical relays 74 in FIG. 8 described above, is inserted in the optical fiber 73 serving as one example of a transmission line between the optical transmission device 71 and the optical transmission device 72, and amplifies signal light propagating through the optical fiber 73. The optical communication system of the present example embodiment, as with the configuration in FIG. 8, includes the optical fiber 73 that connects the optical transmission device 71 in a terminal station A and the optical transmission device 72 in a terminal station B and serves as one example of the transmission line that transmits signal light transmitted and received between the optical transmission device 71 and the optical transmission device 72 and the optical relays 74 that are inserted in the optical fiber 73 and amplify the signal light beams.

Figure 9:
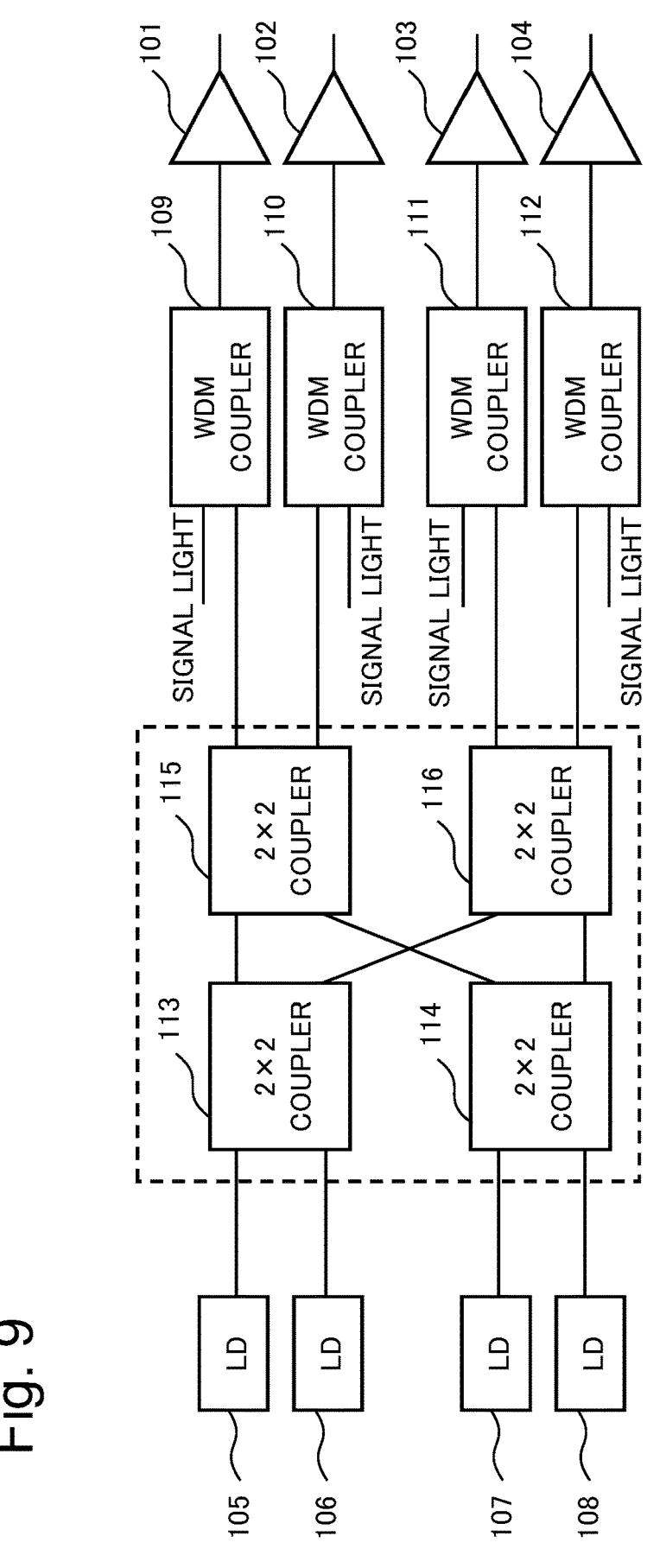
FIG. 9 is a configuration diagram for describing an optical amplifier of the background art.

The optical amplifier in FIG. 2 differs from an optical amplifier in the background art in FIG. 9 in that, while the number of excitation light sources is four and the number of erbium-doped fiber amplifiers (EDFAs) is four in the background art, the number of excitation light sources is five and the number of EDFAs is ten in the optical amplifier in FIG. 2 and the optical amplifier in FIG. 2 includes excitation light demultiplexing units for splitting excitation light.

The optical amplifier in FIG. 2 also differs from the optical amplifier in the background art in FIG. 9 in that, while each of the excitation light sources is provided with a dedicated control system in the optical amplifier in the background art, some of the excitation light sources are controlled by an identical control system in the present example embodiment. That is, in the present example embodiment, laser diodes (LD1 and LD2) serving as excitation light sources are driven by a driving current having a current value A supplied from a control system A that is a shared control system and laser diodes (LD3 and LD4) serving as excitation light sources are driven by a driving current having a current value B supplied from a control system B that is a shared control system. Meanwhile, a laser diode (LD5) serving as an excitation light source is independently driven by a driving current having a current value C supplied from a control system C. Note that, in the present example embodiment, the driving current having the current value A is one example of a first driving current, the driving current having the current value C is one example of a second driving current, and the driving current having the current value B is one example of a third driving current.

The optical amplifier of the present example embodiment includes, as one example of a plurality of excitation light sources, an excitation light source 11a (LD1), an excitation light source 11b (LD2), an excitation light source 11c (LD3), an excitation light source 11d (LD4), and an excitation light source 11e (LD5). In the present example embodiment, the excitation light source 11a (LD1) is one example of a first excitation light source and the excitation light source 11b (LD2) is one example of a second excitation light source. Further, in the present example embodiment, the excitation light source 11e (LD5) is one example of a third excitation light source, the excitation light source 11c (LD3) is one example of a fourth excitation light source, and the excitation light source 11d (LD4) is one example of a fifth excitation light source.

In the optical amplifier in the present example embodiment, the number of the plurality of excitation light sources is an odd number, and, in the optical amplifier in FIG. 2, the number of excitation light sources is five. The excitation light sources 11a to 11e (LD1 to LD5) are LDs of the same product type, and photoelectric conversion efficiencies of the LDs is distributed over a certain distribution width due to production variation with a typical value as a center. Each beam of output light from the LDs is demultiplexed into excitation light of two systems by one of 1×2 couplers 12a to 12e in the excitation light demultiplexing units, and excitation light of ten systems in total are emitted from the excitation light demultiplexing units. In the present example embodiment, the 1×2 coupler 12a is one example of a first excitation light demultiplexing unit, and the 1×2 coupler 12b is one example of a second excitation light demultiplexing unit. Further, in the present example embodiment, the 1×2 coupler 12e is one example of a third excitation light demultiplexing unit, the 1×2 coupler 12c is one example of a fourth excitation light demultiplexing unit, and the 1×2 coupler 12d is one example of a fifth excitation light demultiplexing unit.

As illustrated in FIG. 2, each beam of the excitation light of ten systems is incident on one of ten input ports of excitation light multiplexing/demultiplexing units that include ten 2×2 couplers 13a to 13j. In the present example embodiment, the 2×2 coupler 13a is one example of a first excitation light multiplexing/demultiplexing unit, and the 2×2 coupler 13b is an example of a second excitation light multiplexing/demultiplexing unit. Further, in the present example embodiment, the 2×2 coupler 13e is one example of a third excitation light multiplexing/demultiplexing unit, the 2×2 coupler 13c is one example of a fourth excitation light multiplexing/demultiplexing unit, and the 2×2 coupler 13d is one example of a fifth excitation light multiplexing/demultiplexing unit.

Each beam of excitation light emitted from ten output ports of the excitation light multiplexing/demultiplexing units is incident on one of ten EDFAs 15a to 15j via one of wavelength division multiplexing (WDM) couplers 14a to 14j. Although designed center values of split ratios of the 1×2 couplers 12a to 12e serving as the excitation light demultiplexing units and the 2×2 couplers 13a to 13j serving as the excitation light multiplexing/demultiplexing units are set to 50:50, the split ratios vary with a certain distribution width due to production variation in practice.

Next, correspondence relationships between the excitation light sources and the EDFAs will be described as a configuration of the present example embodiment. Although four numerals each of which is chosen from numbers 1 to 5 are illustrated beside an output unit of each of the EDFAs 15a to 15j in FIG. 2, the numbers 1 to 5 correspond to the laser diodes LD1 to LD5 serving as the excitation light sources 11a to 11e, respectively. For example, although numerals "3, 4, 1, 5" are illustrated beside the output unit of the EDFA 15e, the numerals indicate that output powers from the laser diodes LD3, LD4, LD1, and LD5 serving as the excitation light sources are incident on the EDFA 15e. Herein, as illustrated in FIG. 2, all the EDFAs 15a to 15j are excited by four different LDs among the laser diodes LD1 to LD5 serving as the excitation light sources. This configuration is, as with the configuration in the background art in FIG. 9, a 4-LD redundant configuration.

Operation and Design of Example Embodiment

Next, operation and design of the optical amplifier of the example embodiment according to the present invention will be described. Optical outputs of the EDFAs 15a to 15j are controlled by power of the excitation LDs that are incident on the EDFAs. The output powers of the excitation LDs are controlled by driving currents supplied from the control systems A, B, and C to the excitation LDs. In other words, the optical output of the EDFAs 15a to 15j are controlled by current amounts supplied from the control systems A, B, and C.

Herein, optical outputs of each of pairs of the EDFAs 15a and 15b, 15c and 15d, 15e and 15f, 15g and 15h, and 15i and 15j are designed to be constantly equal to each other within the pair. This design is a design that enables optical outputs to be constantly equal to each other within each pair regardless of supplied current amounts from the control systems A, B, and C. Such a design is enabled by selecting 2×2 couplers 13a to 13j at the preceding stage to the WDM couplers 14a to 14j that causes the 2×2 couplers 13a to 13j to have split ratios as close to 50:50 that is a designed center value as possible within a distribution width due to production variation and further adjusting the WDM couplers 14a to 14j and the EDFAs 15a to 15j in such a way that products between losses of the WDM couplers 14a to 14j and efficiencies of the EDFAs 15a to 15j well balance within the pairs.

Herein, on this occasion, the optical outputs of the pairs of the EDFAs 15a and 15b, 15c and 15d, 15e and 15f, 15g and 15h, and 15i and 15j are denoted by P1, P2, P3, P4, and P5, respectively. Relationships between the supplied current amounts A, B, and C from the control systems A, B, and C and the optical outputs P1 to P5 from the EDFAs can be expressed by the equations in FIG. 3. Coefficients K11 to K53 in the equations are numerical values determined based on efficiencies of the excitation light sources (LD1 to LD5), transmittances of the couplers (12a to 12e and 13a to 13j), and efficiencies of the EDFAs 15a to 15j.

In an optical communication system including a plurality of optical fiber channels, it is preferable to adjust outputs from optical amplifiers in the channels in such a way that the outputs become equal to one another as much as possible. In order to find out what values of the supplied current amounts A, B, and C from the control systems A, B, and C cause the optical outputs P1 to P5 from the EDFAs to become equal to one another, it is only necessary to convert the equations in FIG. 3 to simultaneous equations as illustrated in FIG. 4 by assuming that P1=P2=P3=P4=P5=P and the supplied current amounts A, B, and C are unknowns in the equations in FIG. 3 and to solve the simultaneous equations.

However, since the simultaneous equations in FIG. 4, while having three unknowns, have five equations, there is in general no solution. In the optical amplifier of the present example embodiment, a combination of components, such as the LDs, the couplers, and the EDFAs, is optimized in such a way that a solution of the simultaneous equations is to be found. Next, a method for the optimization will be described by use of FIG. 5. Numerals each of which is chosen from numbers 1 to 5 that are illustrated on the right side of the right-hand side of each equation in FIG. 5 is the same numerals as the numerals each of which indicates one of the excitation light sources (LD1 to LD5) that are illustrated on the right side in FIG. 2, and the numbers 1 to 5 indicate that the power of LD1 to LD5 contributes to one of the optical outputs P1 to P5 from the EDFAs that the equation expresses, respectively. Although, in FIG. 5, symbols each of which is chosen from A, B, and C are illustrated in the lower row of numerals each of which is chosen from numbers 1 to 5, the symbols indicate by which current of the current A, the current B, and the current C each of the excitation light sources (LD1 to LD5) is driven in FIG. 2.

When paying attention to symbols A, B, and C beside the equation (2) in FIG. 4, that is, the optical output P2 from the EDFAs 15c and 15d, two As, one B, and one C are included, which indicates that LDs of two systems both of which are driven by the current A contribute to the optical output P2 and, meanwhile, an LD of one system that is driven by the current B and an LD of one system that is driven by the current C contribute to the optical output P2. That is, influence of the current A on the optical output P2 from EDFAs expressed by the equation (2) is approximately twice influence of each of the current B and the current C. Therefore, the coefficient K21 on the left-hand side of the equation (2) has a value approximately twice the value of each of the coefficients K22 and K23. Meanwhile, the coefficients K22 and K23 have approximately the same value.

Such a magnitude relationship is illustrated by marking the coefficient K21 with a circle and the coefficients K22 and K23 with squares in FIG. 5. Coefficients K in the other equations in FIG. 5 are likewise marked with a circle or a square. The coefficient K13 is marked with a triangle indicating that, as can be inferred from alphabetic symbols on the right-hand side of the equation (1), the current C does not contribute to the optical output P1 from the EDFAs 15a and 15b, which is expressed by the equation (1), that is, K13=0 holds, differing from the other coefficients K.

With regard to the left-hand sides of the equations in FIG. 5, the coefficients of variables A, B, and C are each marked by the same marks, that is, the coefficients of the variables A, B, and C each have close values, between the equations (2) and (5) and between the equations (3) and (4). As described afore, the coefficients K are numerical values determined based on efficiencies of the excitation light sources (LD1 to LD5), split ratios or transmission losses of the couplers (12a to 12e and 13a to 13j) included in the excitation light demultiplexing units and the excitation light multiplexing/demultiplexing units, and efficiencies of the EDFAs 15a to 15j, and, further, the efficiencies of the excitation light sources, the split ratios or the transmission losses of the couplers, and the efficiencies of the EDFAs are values varying over certain distribution widths due to production variation with certain typical values or designed center values as centers.

Therefore, by optimizing the combination of the components described above, it is possible to adjust the K values that are originally close to each other (the K values marked with the same mark) to substantially the same value as each other. In the optical amplifier of the example embodiment according to the present invention, because of this principle, it is assumed that the coefficients of the variables A, B, and C are substantially the same values in the left-hand sides between the equations (2) and (5) and between the equations (3) and (4) in FIG. 5. That is, it is assumed that, in the equations (2) and (5) in FIG. 5, $$K21 = K51,$$

$$K22 = K52, \text{ and}$$

$$K23 = K53.$$

It is also assumed that, in the equations (3) and (4) in FIG. 5, $$K31 = K41,$$

$$K32 = K42, \text{ and}$$

$$K33 = K43.$$

Herein, when it is assumed that, in the equations (2) and (5) in FIG. 5, $$K21 = K51 \equiv KX1,$$

$$K22 = K52 \equiv KX2, \text{ and}$$

$$K23 = K53 \equiv KX3,$$

and further in the equations (3) and (4) in FIG. 5, $$K31 = K41 \equiv KY1,$$

$$K32 = K42 \equiv KY2, \text{ and}$$

$$K33 = K43 \equiv KY3,$$

the equations in FIG. 5 are expressed by equations in FIG. 6. Since, in FIG. 6, the equations (2) and (5) and the equations (3) and (4) are identical equations, eliminating one equation from each of a pair of the equations (2) and (5) and a pair of the equations (3) and (4) causes the simultaneous equations in FIG. 6 to be converted to simultaneous equations as illustrated in FIG. 7. Since the simultaneous equations in FIG. 7, while having three variables (unknowns) A, B, and C, include three equations, the simultaneous equations can be solved in general. That is, by adjusting the current A, the current B, and the current C, it is possible to adjust all the optical outputs P1 to P5 from the EDFAs 15*a* to 15*j* to the same power.

Advantageous Effects of Example Embodiment

Next, advantageous effects of the example embodiment according to the present invention will be described. According to the present example embodiment, it is possible to provide an optical amplifier, an optical relay, and an optical communication system capable of amplifying signal light of a plurality of systems and achieving cost reduction. The reason for the advantageous effect is that, for ten EDFAs 15*a* to 15*j* that amplify signal light of a plurality of systems, an optical amplifier can be configured by including five excitation light sources (LD1 to LD5), which is smaller in number than the EDFAs 15*a* to 15*j*. Another reason for the advantageous effect is that employing a configuration in which LD1 and LD2 among the plurality of excitation light sources (LD1 to LD5) are driven in common by a driving current having the current value A supplied from the control system A enables the configuration to be simplified compared with a case where the excitation light source 11*a* (LD1) and the excitation light source 11*b* (LD2) are separately controlled by different control systems. Still another reason for the advantageous effect is that employing a configuration in which LD3 and LD4 among the plurality of excitation light sources (LD1 to LD5) are driven in common by a driving current having the current value B supplied from the control system B enables the configuration to be simplified compared with a case where the excitation light source 11*c* (LD3) and the excitation light source 11*d* (LD4) are separately controlled by different control systems.

For example, when a configuration in which the excitation light source 11*a* (LD1) and the excitation light source 11*b* (LD2) are separately controlled by different control systems is employed, although it is easy to make optical outputs from a plurality of EDFAs among the EDFAs 15*a* to 15*j* the same as one another, cost increases. In contrast, according to the present example embodiment, by employing a configuration in which the excitation light source 11*a* (LD1) and the excitation light source 11*b* (LD2) are driven in common by a driving current having the current value A supplied from the control system A, it is possible to reduce the number of control circuits and simplify the configuration and, at the same time, it is possible to make the optical outputs of a plurality of EDFAs among the EDFAs 15*a* to 15*j* the same as one another.

According to the present example embodiment, by making use of variation in properties of passive optical components, such as the plurality of excitation light sources (LD1 to LD5), the 1×2 couplers 12*a* to 12*e* constituting the plurality of excitation light demultiplexing units, and the 2×2 couplers 13*a* to 13*j* constituting the excitation light multiplexing/demultiplexing units, it is possible to make the optical outputs of the EDFAs 15*a* to 15*j* the same as one another.

Further, the reason for the advantageous effect is that, at the time of configuring the optical amplifier of the present example embodiment, the combination of components, such as the plurality of excitation light sources, the plurality of excitation light demultiplexing units, and the excitation light multiplexing/demultiplexing units, is optimized in consideration of influence of excitation light from the excitation light source 11*a* (LD1) and the excitation light source 11*b* (LD2), influence of excitation light from the excitation light source 11*c* (LD3) and the excitation light source 11*d* (LD4), and influence of excitation light from the excitation light source 11*e* (LD5) on an optical output of one EDFA among the EDFAs 15*a* to 15*j*.

In other words, according to the present example embodiment, it is possible to achieve an advantageous effect that, in the optical amplifier of the present example embodiment, as described afore, optimizing the combination of components by paying attention to what extent which current of the current A of the control system A, the current B of the control system B, and the current C of the control system C contributes to increases and decreases in the optical outputs P1 to P5 from the EDFAs 15*a* to 15*j* enables all the outputs P1 to P5 from the EDFAs to be adjusted to the same power.

Further, as illustrated in FIG. 2, in the optical amplifier of the present example embodiment, since a plurality of LDs, for example, LD1 and LD2, are driven by a common current (current A), it is possible to reduce the number of driving circuits, and, since a plurality of LDs, for example, LD3 and LD4, are driven by a common current (current B), it also becomes possible to reduce the number of driving circuits. As described above, since a plurality of LDs are driven by a common current by employing a configuration in which some LDs among a plurality of LDs constituting the optical amplifier are driven by a common current, it becomes possible to reduce the number of driving circuits and to achieve an advantageous effect that production cost of an optical amplifier configuration can be reduced.

Some of the plurality of excitation light sources 11*a* to 11*e*, namely the excitation light source 11*a* and the excitation light source 11*b*, are driven by a current amount A of an identical driving current or some other excitation light sources, namely the excitation light source 11*c* and the excitation light source 11*d*, are driven by a current amount B of an identical driving current, and the efficiencies of the plurality of excitation light sources, the transmission losses of the optical couplers included in the excitation light demultiplexing units and the excitation light multiplexing/demultiplexing units, and the efficiencies of the EDFAs are adjusted according to which excitation light sources among the plurality of excitation light sources are driven by an identical driving current. By adjusting driving currents of the plurality of excitation light sources in such a way that all the optical outputs of the EDFAs become equal to one another, it becomes possible to provide an optical amplifier capable of amplifying signal light of a plurality of systems and achieving cost reduction.

By being able to achieve an optical amplifier capable of amplifying signal light of a plurality of systems and enabling cost reduction, it is possible to achieve cost reduction with respect to the optical relays 74 that are inserted in the optical fiber 73 serving as one example of a transmission line between the optical transmission device 71 and the optical transmission device 72 and use the optical amplifier. By being able to achieve an optical amplifier capable of amplifying signal light of a plurality of systems and enabling cost reduction, it is possible to achieve cost reduction with respect to the optical communication system that includes the optical fiber 73 that connects the optical transmission device 71 in the terminal station A and the optical transmission device 72 in the terminal station B and transmits transmitted and received signal light and the optical relays 74 that are inserted in the optical fiber 73 and amplify the signal light.

While the preferable example embodiment of the present invention was described above, the invention is not limited to the embodiment. For example, the number of a plurality of excitation light sources in the optical amplifier of the example embodiment described above is neither limited to three nor five as described above, and the optical amplifier is only required to include an odd number of excitation light sources and the number of excitation light sources may be seven or nine. On this occasion, the number of the plurality of excitation light sources is only required to be smaller than the number of the plurality of EDFAs in the optical amplifier and to be an odd number, and it is only necessary to employ a configuration in which a pair of LDs among the plurality of excitation light sources are driven in common by a driving current supplied from a shared control system. Although, in the example embodiment described above, an optical fiber amplification unit in which erbium (Er) is doped was employed and described as the impurity-doped optical fiber amplification unit, the impurity-doped optical fiber amplification unit of the example embodiment according to the present invention is not limited to the EDFA. An optical fiber amplification unit in which impurities other than erbium are doped, for example, an optical fiber amplification unit in which praseodymium (Pr) is doped (PDFA) or an optical fiber amplification unit in which thulium (Tm) is doped (TDFA), may be used, and it is only necessary to select an optical fiber amplification unit matching a wavelength band of signal light amplified by the optical amplifier. Various modifications can be made without departing from the spirit and scope of the present invention as defined by the claims, and it goes without saying that the modifications are included in the present invention.

INDUSTRIAL APPLICABILITY

Examples of utilization of the present invention include an optical amplifier for relay in a long-distance optical communication system.

This application is based upon and claims the benefit of priority from Japanese Patent Application No. 2021-51265, filed on Mar. 25, 2021, the disclosure of which is incorporated herein in its entirety by reference.

REFERENCE SIGNS LIST

10a Control system A
10b Control system B
10c Control system C
11a to 11e LD
12a to 12c 1×2 coupler
13a to 13j 2×2 coupler
14a to 14j WDM coupler
15a to 15j EDFA
71, 72 Optical transmission device
73 Optical fiber
74 Optical relay

What is claimed is:

1. An optical amplifier amplifying and outputting signal light of a plurality of systems, the optical amplifier comprising:

a plurality of impurity-doped optical fiber amplification units; a plurality of excitation light sources; a plurality of excitation light demultiplexing units that demultiplex excitation light from the plurality of excitation light sources; a plurality of excitation light multiplexing/demultiplexing units that multiplex and demultiplex excitation light from the plurality of excitation light demultiplexing units; and a plurality of multiplexing units each of which multiplexes one of the plurality of beams of signal light and excitation light from the plurality of excitation light multiplexing/demultiplexing units and subsequently inputs the multiplexed light to one of the plurality of impurity-doped optical fiber amplification units, wherein the plurality of excitation light sources include at least a first excitation light source and a second excitation light source that are driven in common by a first driving current, and a third excitation light source that is driven by a second driving current of a different system from the first driving current, the plurality of excitation light demultiplexing units include at least a first excitation light demultiplexing unit, a second excitation light demultiplexing unit, and a third excitation light demultiplexing unit, the plurality of excitation light multiplexing/demultiplexing units include at least a first excitation light multiplexing/demultiplexing unit, a second excitation light multiplexing/demultiplexing unit, and a third excitation light multiplexing/demultiplexing unit, excitation light from the plurality of excitation light sources goes through the plurality of excitation light demultiplexing units and the plurality of excitation light multiplexing/demultiplexing units and is input to the plurality of multiplexing units, and the plurality of excitation light sources, the plurality of excitation light demultiplexing units, and the plurality of excitation light multiplexing/demultiplexing units are selected in consideration of contribution of excitation light from the first excitation light source and excitation light from the second excitation light source, and contribution of excitation light from the third excitation light source, to an optical output of each impurity-doped optical fiber amplification unit among the plurality of impurity-doped optical fiber amplification units.

2. The optical amplifier according to claim 1, wherein the plurality of excitation light sources, the plurality of excitation light demultiplexing units, and the plurality of excitation light multiplexing/demultiplexing units are selected in such a way that optical outputs of the plurality of impurity-doped optical fiber amplification units become substantially equal to one another.

3. The optical amplifier according to claim 1, wherein, when both excitation light from the first excitation light source and excitation light from the second excitation light source contribute to an optical output of one impurity-doped optical fiber amplification unit, the plurality of excitation light sources, the plurality of excitation light demultiplexing units, and the plurality of excitation light multiplexing/demultiplexing units are selected by significantly evaluating magnitude of the contribution.

4. The optical amplifier according to claim 1, wherein, when excitation light from the third excitation light source does not contribute to an optical output of one impurity-doped optical fiber amplification unit, the plurality of excitation light sources, the plurality of excitation light demultiplexing units, and the plurality of excitation light multiplexing/demultiplexing units are selected by evaluating that there is no contribution from the third excitation light source.

5. The optical amplifier according to claim 1, wherein the plurality of excitation light sources further include a fourth excitation light source and a fifth excitation light source that are driven in common by a third driving current of a different system from the first driving current and the second driving current, the plurality of excitation light demultiplexing units further include a fourth excitation light demultiplexing unit and a fifth excitation light demultiplexing unit, the plurality of excitation light multiplexing/demultiplexing units further include a fourth excitation light multiplexing/demultiplexing unit and a fifth excitation light multiplexing/demultiplexing unit, and the plurality of excitation light sources, the plurality of excitation light demultiplexing units, and the plurality of excitation light multiplexing/demultiplexing units are selected in consideration of contribution of excitation light from the first excitation light source and excitation light from the second excitation light source, contribution of excitation light from the third excitation light source, and contribution of excitation light from the fourth excitation light source and excitation light from the fifth excitation light source, to an optical output of each impurity-doped optical fiber amplification unit among the plurality of impurity-doped optical fiber amplification units.

6. An optical relay being inserted in an optical fiber that propagates the signal light of a plurality of systems, the optical relay comprising the optical amplifier according to claim 1.

7. An optical communication system comprising:

an optical fiber that connects a plurality of terminal stations and propagates the signal light of a plurality of systems; and the optical relay according to claim 6.

8. The optical amplifier according to claim 2, wherein, when both excitation light from the first excitation light source and excitation light from the second excitation light source contribute to an optical output of one impurity-doped optical fiber amplification unit, the plurality of excitation light sources, the plurality of excitation light demultiplexing units, and the plurality of excitation light multiplexing/demultiplexing units are selected by significantly evaluating magnitude of the contribution.

9. The optical amplifier according to claim 2, wherein, when excitation light from the third excitation light source does not contribute to an optical output of one impurity-doped optical fiber amplification unit, the plurality of excitation light sources, the plurality of excitation light demultiplexing units, and the plurality of excitation light multiplexing/demultiplexing units are selected by evaluating that there is no contribution from the third excitation light source.

10. The optical amplifier according to claim 2, wherein the plurality of excitation light sources further include a fourth excitation light source and a fifth excitation light source that are driven in common by a third driving current of a different system from the first driving current and the second driving current, the plurality of excitation light demultiplexing units further include a fourth excitation light demultiplexing unit and a fifth excitation light demultiplexing unit, the plurality of excitation light multiplexing/demultiplexing units further include a fourth excitation light multiplexing/demultiplexing unit and a fifth excitation light multiplexing/demultiplexing unit, and the plurality of excitation light sources, the plurality of excitation light demultiplexing units, and the plurality of excitation light multiplexing/demultiplexing units are selected in consideration of contribution of excitation light from the first excitation light source and excitation light from the second excitation light source, contribution of excitation light from the third excitation light source, and contribution of excitation light from the fourth excitation light source and excitation light from the fifth excitation light source, to an optical output of each impurity-doped optical fiber amplification unit among the plurality of impurity-doped optical fiber amplification units.

11. The optical amplifier according to claim 3, wherein the plurality of excitation light sources further include a fourth excitation light source and a fifth excitation light source that are driven in common by a third driving current of a different system from the first driving current and the second driving current, the plurality of excitation light demultiplexing units further include a fourth excitation light demultiplexing unit and a fifth excitation light demultiplexing unit, the plurality of excitation light multiplexing/demultiplexing units further include a fourth excitation light multiplexing/demultiplexing unit and a fifth excitation light multiplexing/demultiplexing unit, and the plurality of excitation light sources, the plurality of excitation light demultiplexing units, and the plurality of excitation light multiplexing/demultiplexing units are selected in consideration of contribution of excitation light from the first excitation light source and excitation light from the second excitation light source, contribution of excitation light from the third excitation light source, and contribution of excitation light from the fourth excitation light source and excitation light from the fifth excitation light source, to an optical output of each impurity-doped optical fiber amplification unit among the plurality of impurity-doped optical fiber amplification units.

12. The optical amplifier according to claim 4, wherein the plurality of excitation light sources further include a fourth excitation light source and a fifth excitation light source that are driven in common by a third driving current of a different system from the first driving current and the second driving current, the plurality of excitation light demultiplexing units further include a fourth excitation light demultiplexing unit and a fifth excitation light demultiplexing unit, the plurality of excitation light multiplexing/demultiplexing units further include a fourth excitation light multiplexing/demultiplexing unit and a fifth excitation light multiplexing/demultiplexing unit, and the plurality of excitation light sources, the plurality of excitation light demultiplexing units, and the plurality of excitation light multiplexing/demultiplexing units are selected in consideration of contribution of excitation light from the first excitation light source and excitation light from the second excitation light source, contribution of excitation light from the third excitation light source, and contribution of excitation light from the fourth excitation light source and excitation light from the fifth excitation light source, to an optical output of each impurity-doped optical fiber amplification unit among the plurality of impurity-doped optical fiber amplification units.

13. An optical relay being inserted in an optical fiber that propagates the signal light of a plurality of systems, the optical relay comprising the optical amplifier according to claim 2.

14. An optical relay being inserted in an optical fiber that propagates the signal light of a plurality of systems, the optical relay comprising the optical amplifier according to claim 3.

15. An optical relay being inserted in an optical fiber that propagates the signal light of a plurality of systems, the optical relay comprising the optical amplifier according to claim 4.

16. An optical relay being inserted in an optical fiber that propagates the signal light of a plurality of systems, the optical relay comprising the optical amplifier according to claim 5.

17. An optical communication system comprising:

an optical fiber that connects a plurality of terminal stations and propagates the signal light of a plurality of systems; and the optical relay according to claim 13.

18. An optical communication system comprising:

an optical fiber that connects a plurality of terminal stations and propagates the signal light of a plurality of systems; and the optical relay according to claim 14.

19. An optical communication system comprising:

an optical fiber that connects a plurality of terminal stations and propagates the signal light of a plurality of systems; and the optical relay according to claim 15.

20. An optical communication system comprising:

an optical fiber that connects a plurality of terminal stations and propagates the signal light of a plurality of systems; and the optical relay according to claim 16.

\* \* \* \* \*